United States Patent
Rao et al.

(10) Patent No.: US 9,422,451 B2
(45) Date of Patent: Aug. 23, 2016

(54) LOW DENSITY FUEL RESISTANT SULFUR-CONTAINING POLYMER COMPOSITIONS AND USES THEREOF

(71) Applicant: PRC-DeSoto International, Inc., Sylmar, CA (US)

(72) Inventors: Chandra Rao, Valencia, CA (US); Marfi Ito, Culver City, CA (US); Renhe Lin, Stevenson Ranch, CA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 0 days.

(21) Appl. No.: 14/593,069

(22) Filed: Jan. 9, 2015

(65) Prior Publication Data
US 2016/0208137 A1    Jul. 21, 2016

(51) Int. Cl.
| | |
|---|---|
| *C08G 75/04* | (2016.01) |
| *C08F 283/00* | (2006.01) |
| *C08G 59/14* | (2006.01) |
| *C08L 63/00* | (2006.01) |
| *C08G 75/00* | (2006.01) |
| *C08L 81/00* | (2006.01) |
| *C08F 290/06* | (2006.01) |
| *C08K 5/00* | (2006.01) |
| *C08G 75/02* | (2016.01) |
| *C09D 181/02* | (2006.01) |
| *C09D 163/00* | (2006.01) |
| *B60K 15/03* | (2006.01) |

(52) U.S. Cl.
CPC ............. *C09D 181/02* (2013.01); *B60K 15/03* (2013.01); *C09D 163/00* (2013.01); *B60K 2015/03493* (2013.01)

(58) Field of Classification Search
None
See application file for complete search history.

(56) References Cited

U.S. PATENT DOCUMENTS

| | | | |
|---|---|---|---|
| 4,366,307 | A | 12/1982 | Singh et al. |
| 4,609,762 | A | 9/1986 | Morris et al. |
| 4,623,711 | A | 11/1986 | Morris et al. |
| 5,225,472 | A | 7/1993 | Cameron et al. |
| 6,172,179 | B1 | 1/2001 | Zook et al. |
| 6,509,418 | B1 | 1/2003 | Zook et al. |
| 6,525,168 | B2 | 2/2003 | Zook et al. |
| 7,009,032 | B2 | 3/2006 | Bojkova et al. |
| 7,671,145 | B2 | 3/2010 | Sawant et al. |
| 7,879,955 | B2 | 2/2011 | Rao et al. |
| 8,513,339 | B1 | 8/2013 | Keledjian et al. |
| 2007/0299217 | A1* | 12/2007 | Sawant et al. ............... 525/523 |
| 2010/0010133 | A1 | 1/2010 | Zook et al. |
| 2011/0319559 | A1 | 12/2011 | Kania et al. |
| 2012/0234205 | A1 | 9/2012 | Hobbs et al. |
| 2012/0238707 | A1 | 9/2012 | Hobbs et al. |
| 2013/0079485 | A1* | 3/2013 | Cai et al. ..................... 528/55 |
| 2013/0082214 | A1* | 4/2013 | Sharaby et al. ............. 252/511 |
| 2013/0345371 | A1* | 12/2013 | Anderson et al. .......... 525/523 |

FOREIGN PATENT DOCUMENTS

| | | |
|---|---|---|
| FR | 2320342 | 3/1977 |
| WO | WO 2014/205319 | 12/2014 |

OTHER PUBLICATIONS

Wikipedia, The Free Encyclopedia, "Polyphenylene sulfide", page last modified on Oct. 1, 2015, retrieved from https://en.wikipedia.org/wiki/Poly(p-phenylene_sulfide)#cite_ref-Parker_1-0 on Nov. 11, 2015, 3 pages.
AzkoNobel, Product Data Sheet, Thioplast™ G21, Jan. 2009, 1 page.
AzkoNobel, Product Data Sheet, Thioplast™ G131, Jan. 2009, 1 page.

* cited by examiner

*Primary Examiner* — Susannah Chung
*Assistant Examiner* — Robert T Butcher
(74) *Attorney, Agent, or Firm* — William R. Lambert

(57) ABSTRACT

Low-density compositions and sealants prepared from sulfur-containing prepolymer compositions that exhibit enhanced fuel resistance are disclosed. The low density and enhanced fuel resistance is realized by using polyphenylene sulfide fillers.

18 Claims, No Drawings

LOW DENSITY FUEL RESISTANT SULFUR-CONTAINING POLYMER COMPOSITIONS AND USES THEREOF

FIELD

The present disclosure relates to low density fuel-resistant sulfur-containing polymer compositions and sealants having enhanced fuel resistance.

BACKGROUND

In certain applications such as in the aircraft and vehicular industries, it can be desirable to reduce the overall weight of materials. For example, the weight of a polymeric composition can be reduced by incorporating low density fillers. In aerospace applications, coatings and sealants must meet a number of demanding performance requirements that include adhesion, tensile strength, elongation, and high temperature stability, and these properties must be maintained following exposure to aviation fuel. Low density fillers such as hollow polymeric microspheres are effective in reducing the overall density of the polymeric composition but tend to swell upon exposure to aviation fuel and cause degradation in the physical properties of a cured coating or sealant. Inorganic fillers provide reinforcing effects but increase the density of the cured coating or sealant.

Low density coating and sealant compositions exhibiting enhanced fuel resistance are desired.

SUMMARY

The fuel resistance of sulfur-containing prepolymers based sealants can be improved by incorporating a polyphenylene sulfide filler into the sealant. The use of polyphenylene sulfide fillers provides low density coating and sealant compositions suitable for use in aerospace applications.

In a first aspect, compositions are provided, comprising: a sulfur-containing prepolymer; and a filler comprising a polyphenylene sulfide filler, wherein the composition is characterized by a specific gravity from 1.1 to 1.4.

In a second aspect, compositions are provided, comprising: (a) a thiol-terminated sulfur-containing prepolymer; (b) a filler comprising a polyphenylene sulfide filler and an inorganic filler; and (c) a polyepoxy curing agent selected from a Novolac® epoxy resin, a bisphenol A/epichlorohydrin derived epoxy resin, and a combination thereof, wherein the composition is characterized by a specific gravity from 1.1 to 1.4.

In a third aspect, cured sealants prepared from a composition provided by the present disclosure are provided.

In a fourth aspect, methods of sealing one or more surfaces are provided, comprising: applying a composition provide the present disclosure to one or more surfaces; and curing the composition to seal the one or more surfaces.

DETAILED DESCRIPTION

For purposes of the following detailed description it is to be understood that embodiments provided by the present disclosure may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges encompassed within the range. For example, a range of "1 to 10" is intended to include all sub-ranges between (and including) the recited minimum value of 1 and the recited maximum value of 10, that is, having a minimum value equal to or greater than 1 and a maximum value equal to or less than 10.

A dash ("—") that is not between two letters or symbols is used to indicate a point of bonding for a substituent or between two atoms. For example, —$CONH_2$ is attached to another chemical moiety through the carbon atom.

"Alkanediyl" refers to a diradical of a saturated, branched or straight-chain, acyclic hydrocarbon group, having, for example, from 1 to 18 carbon atoms ($C_{1-18}$), from 1 to 14 carbon atoms ($C_{1-14}$), from 1 to 6 carbon atoms ($C_{1-6}$), from 1 to 4 carbon atoms ($C_{1-4}$), or from 1 to 3 hydrocarbon atoms ($C_{1-3}$). It will be appreciated that a branched alkanediyl has a minimum of three carbon atoms. In certain embodiments, the alkanediyl is $C_{2-14}$ alkanediyl, $C_{2-10}$ alkanediyl, $C_{2-8}$ alkanediyl, $C_{2-6}$ alkanediyl, $C_{2-4}$ alkanediyl, and in certain embodiments, $C_{2-3}$ alkanediyl. Examples of alkanediyl groups include methane-diyl (—$CH_2$—), ethane-1,2-diyl (—$CH_2CH_2$—), propane-1,3-diyl and iso-propane-1,2-diyl (e.g., —$CH_2CH_2CH_2$— and —$CH(CH_3)CH_2$—), butane-1,4-diyl (—$CH_2CH_2CH_2CH_2$—), pentane-1,5-diyl (—$CH_2CH_2CH_2CH_2CH_2$—), hexane-1,6-diyl (—$CH_2CH_2CH_2CH_2CH_2CH_2$—), heptane-1,7-diyl, octane-1,8-diyl, nonane-1,9-diyl, decane-1,10-diyl, dodecane-1,12-diyl, and the like.

"Alkanecycloalkane" refers to a saturated hydrocarbon group having one or more cycloalkyl and/or cycloalkanediyl groups and one or more alkyl and/or alkanediyl groups, where cycloalkyl, cycloalkanediyl, alkyl, and alkanediyl are defined herein. In certain embodiments, each cycloalkyl and/or cycloalkanediyl group(s) is $C_{3-6}$, $C_{5-6}$, and in certain embodiments, cyclohexyl or cyclohexanediyl. In certain embodiments, each alkyl and/or alkanediyl group(s) is $C_{1-6}$, $C_{1-4}$, $C_{1-3}$, and in certain embodiments, methyl, methanediyl, ethyl, or ethane-1,2-diyl. In certain embodiments, the alkanecycloalkane group is $C_{4-18}$ alkanecycloalkane, $C_{4-16}$ alkanecycloalkane, $C_{4-12}$ alkanecycloalkane, $C_{4-8}$ alkanecycloalkane, $C_{6-12}$ alkanecycloalkane, $C_{6-10}$ alkanecycloalkane, and in certain embodiments, $C_{6-9}$ alkanecycloalkane Examples of alkanecycloalkane groups include 1,1,3,3-tetramethylcyclohexane and cyclohexylmethane.

"Alkanecycloalkanediyl" refers to a diradical of an alkanecycloalkane group. In certain embodiments, the alkanecycloalkanediyl group is $C_{4-18}$ alkanecycloalkanediyl, $C_{4-16}$ alkanecycloalkanediyl, $C_{4-12}$ alkanecycloalkanediyl, $C_{4-8}$ alkanecycloalkanediyl, $C_{6-12}$ alkanecycloalkanediyl, $C_{6-10}$ alkanecycloalkanediyl, and in certain embodiments, $C_{6-9}$ alkanecycloalkanediyl. Examples of alkanecycloalkanediyl groups include 1,1,3,3-tetramethylcyclohexane-1,5-diyl and cyclohexylmethane-4,4'-diyl.

"Alkenyl" group refers to a group $(R)_2C=C(R)_2$ or $-C(R)=C(R)_2$ where the alkenyl group is a terminal group and is bonded to a larger molecule. In such embodiments, each R may be selected from, for example, hydrogen and $C_{1-3}$ alkyl. In certain embodiments, each R is hydrogen and an alkenyl group has the structure $-CH=CH_2$.

"Alkyl" refers to a monoradical of a saturated, branched or straight-chain, acyclic hydrocarbon group having, for example, from 1 to 20 carbon atoms, from 1 to 10 carbon atoms, from 1 to 6 carbon atoms, from 1 to 4 carbon atoms, or from 1 to 3 carbon atoms. It will be appreciated that a branched alkyl has a minimum of three carbon atoms. In certain embodiments, the alkyl group is $C_{1-6}$ alkyl, $C_{1-4}$ alkyl, and in certain embodiments, $C_{1-3}$ alkyl. Examples of alkyl groups include methyl, ethyl, n-propyl, iso-propyl, n-butyl, iso-butyl, tert-butyl, n-hexyl, n-decyl, tetradecyl, and the like. In certain embodiments, the alkyl group is $C_{1-6}$ alkyl, $C_{1-4}$ alkyl, and in certain embodiments, $C_{1-3}$ alkyl. It will be appreciated that a branched alkyl has at least three carbon atoms.

"Cycloalkanediyl" refers to a diradical saturated monocyclic or polycyclic hydrocarbon group. In certain embodiments, the cycloalkanediyl group is $C_{3-12}$ cycloalkanediyl, $C_{3-8}$ cycloalkanediyl, $C_{3-6}$ cycloalkanediyl, and in certain embodiments, $C_{5-6}$ cycloalkanediyl. Examples of cycloalkanediyl groups include cyclohexane-1,4-diyl, cyclohexane-1,3-diyl, and cyclohexane-1,2-diyl.

"Oxyalkanediyl" refers to an alkanediyl group in which one or more of the carbon atoms and certain atoms or groups bonded to the one or more carbon atom are replaced with an oxygen atom. In certain embodiments of oxyalkanediyl, the oxygen atoms will not be adjacent to other oxygen atoms. In certain embodiments, oxyalkanediyl is $C_{2-10}$ oxyalkanediyl, $C_{2-8}$ oxyalkanediyl, $C_{2-6}$ oxyalkanediyl, and in certain embodiments, $C_{2-4}$ oxyalkanediyl.

"Specific gravity" refers to the ratio of the density of a substance to the density of water at room temperature and pressure. Density can be measured according to ASTM D 792 Method A.

As used herein, "polymer" refers to oligomers, homopolymers, and copolymers, which may be cured or uncured. Unless stated otherwise, molecular weights are number average molecular weights for polymeric materials indicated as "$M_n$" as determined, for example, by gel permeation chromatography using a polystyrene standard in an art-recognized manner. Unless stated otherwise, molecular weights are number average molecular weights for polymeric materials indicated as "Mn" as may be determined, for example, by gel permeation chromatography using a polystyrene standard in an art-recognized manner.

A "prepolymer" refers to a polymer prior to curing. In general, prepolymers provided by the present disclosure are liquid at room temperature. "Adducts" refer to prepolymers that are functionalized with a reactive terminal group; however, prepolymers may also contain terminal functional group. Thus, the terms prepolymer and adduct are used interchangeably. The term adduct is often used to refer to a prepolymer that is an intermediate in a reaction sequence used to prepare a prepolymer.

Reference is now made in detail to certain embodiments of compounds, compositions, and methods. The disclosed embodiments are not intended to be limiting of the claims. To the contrary, the claims are intended to cover all alternatives, modifications, and equivalents.

Compositions

Low density compositions provided by the present disclosure include a sulfur-containing prepolymer and a polyphenylene sulfide filler. In certain embodiments, a composition is formulated as a sealant, such as an aerospace sealant.

Sulfur-Containing Prepolymers

Sulfur-containing prepolymers are well-known to be useful in aerospace coating and sealant applications in part because of the ability of the products formed from the prepolymers to retain their physical properties following exposure to aviation fuel. Suitable sulfur-containing prepolymers include, for example, polythioethers, polysulfides, sulfur-containing polyformals, and combinations of any of the foregoing. The sulfur-containing prepolymers may be terminated with suitable functional groups appropriate for a particular curing chemistry. For example, the sulfur-containing prepolymers may be thiol-terminated when using polyepoxy curing agents or in UV curable systems employing polyalkenyl compounds. In other embodiments, a sulfur-containing prepolymer may be amine-terminated as appropriate for use with isocyanate curing agents.

In certain embodiments, a sulfur-containing prepolymer is thiol-terminated; accordingly, a sulfur-containing prepolymer may include a thiol-terminated polythioether, a thiol-terminated polysulfide, a thiol-terminated sulfur-containing polyformal, or a combination of any of the foregoing.

In certain embodiments, a sulfur-containing polymer is selected from a polythioether, a polysulfide, a sulfur-containing polyformal, and a combination of any of the foregoing. In certain embodiments, a sulfur-containing prepolymer comprises a polythioether, and in certain embodiments, a sulfur-containing polymer comprises a polysulfide. A sulfur-containing polymer may comprise a mixture of different polythioethers and/or polysulfides, and the polythioethers and/or polysulfides may have the same or different functionality. In certain embodiments, a sulfur-containing polymer has an average functionality from 2 to 6, from 2 to 4, from 2 to 3, from 2.3 to 2.8, and in certain embodiments, from 2.05 to 2.5. For example, a sulfur-containing prepolymer can be selected from a difunctional sulfur-containing prepolymer, a trifunctional sulfur-containing prepolymer, and a combination thereof. In certain embodiments, a sulfur-containing prepolymer can be selected from a sulfur-containing polyformal.

In certain embodiments, a sulfur-containing prepolymer is thiol-terminated. Examples of thiol-terminated polythioethers are disclosed, for example, in U.S. Pat. No. 6,172,179. In certain embodiments, a thiol-terminated polythioether comprises Permapol® P3.1E, and Permapol® L56086, or a combination of any of the foregoing, each of which is available from PRC-DeSoto International Inc., Sylmar, Calif.

Polythioether Prepolymers

Compositions and sealant formulations provided by the present disclosure include a polythioether prepolymer and in certain embodiments, a thiol-terminated polythioether prepolymer.

Examples of suitable polythioethers are disclosed, for example, in U.S. Pat. No. 6,172,179.

In certain embodiments, a polythioether prepolymer comprises a polythioether having a backbone comprising the structure of Formula (1):

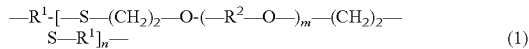  (1)

wherein,
each $R^1$ is independently selected from $C_{2\text{-}10}$ n-alkanediyl, $C_{3\text{-}6}$ branched alkanediyl, $C_{6\text{-}8}$ cycloalkanediyl, $C_{6\text{-}10}$ alkanecycloalkanediyl, a heterocyclic, $-[(-CHR^3-)_p-X-]_q-(CHR^3)_r-$, wherein each $R^3$ is selected from hydrogen and methyl;
each $R^2$ is independently selected from $C_{2\text{-}10}$ n-alkanediyl, $C_{3\text{-}6}$ branched alkanediyl, $C_{6\text{-}8}$ cycloalkanediyl, $C_{6\text{-}14}$ alkanecycloalkanediyl, heterocyclic, and $-[(-CH_2-)_p-X-]_q-(CH_2)_r-$;
each X is independently selected from O, S, and —NR—, wherein R is selected from hydrogen and methyl;
m is an integer from 0 to 50;
n is an integer ranging from 1 to 60;
p is an integer ranging from 2 to 6;
q is an integer ranging from 1 to 5; and
r is an integer ranging from 2 to 10.

In certain embodiments of a compound of Formula (1), $R^1$ is $-[-(CHR^3)_p-X-]_q-(CHR^3)_r-$ wherein each X is independently selected from —O— and —S—. In certain embodiments wherein $R^1$ is $-[-(CHR^3)_p-X-]_q-(CHR^3)_r-$, each X is —O— and in certain embodiments, each X is —S—.

In certain embodiments of a compound of Formula (1), $R^1$ is $-[-(CH_2)_p-X-]_q-(CH_2)_r-$ wherein each X is independently selected from —O— and —S—. In certain embodiments wherein $R^1$ is $-[-(CH_2)_p-X-]_q-(CH_2)_r-$, each X is —O— and in certain embodiments, each X is —S—.

In certain embodiments, $R^1$ in Formula (1) is $-[(-CH_2-)_p-X-]_q-(CH_2)_r-$, where p is 2, X is O, q is 2, r is 2, $R^2$ is ethanediyl, m is 2, and n is 9.

In certain embodiments of Formula (1), each $R^1$ is derived from dimercaptodioxaoctane (DMDO) and in certain embodiments, each $R^1$ is derived from dimercaptodiethylsulfide (DMDS).

In certain embodiments of Formula (1), each m is independently an integer from 1 to 3. In certain embodiments, each m is the same and is 1, 2, and in certain embodiments, 3. In certain embodiments of Formula (1) m is 1 to 50, in certain embodiments, 2 to 40, and in certain embodiments, 1 to 10.

In certain embodiments of Formula (1), n is an integer from 1 to 30, an integer from 1 to 20, an integer from 1 to 10, and in certain embodiments, and an integer from 1 to 5. In addition, in certain embodiments, n may be any integer from 1 to 60.

In certain embodiments of Formula (1), each p is independently selected from 2, 3, 4, 5, and 6. In certain embodiments, each p is the same and is 2, 3, 4, 5, or 6.

In certain embodiments of Formula (1), each r is selected from 2, 3, 4, 5, 6, 7, and 8.

In certain embodiments of Formula (1), each q is selected from 1, 2, 3, 4, and 5.

In certain embodiments, a polythioether prepolymer having a backbone structure of Formula (1) is a thiol-terminated polythioether prepolymer. Examples of suitable thiol-terminated polythioethers are disclosed, for example, in U.S. Pat. No. 6,172,179. In certain embodiments, a thiol-terminated polythioether comprises Permapol® P3.1E, Permapol® L56086, or a combination of any of the foregoing, the products available from PRC-DeSoto International Inc., Sylmar, Calif.

In certain embodiments, a thiol-terminated polythioether comprises a thiol-terminated polythioether selected from a thiol-terminated polythioether of Formula (2a), a thiol-terminated polythioether of Formula (2b), and a combination thereof:

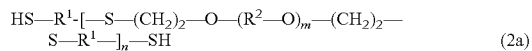  (2a)

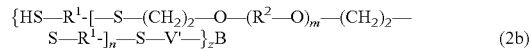  (2b)

wherein,
each $R^1$ independently is selected from $C_{2\text{-}10}$ alkanediyl, $C_{6\text{-}8}$ cycloalkanediyl, $C_{6\text{-}14}$ alkanecycloalkanediyl, $C_{5\text{-}8}$ heterocycloalkanediyl, and $-[(-CHR^3-)_p-X-]_q-(CHR^3-)_r-$, wherein,
p is an integer from 2 to 6;
q is an integer from 1 to 5;
r is an integer from 2 to 10;
each $R^3$ is independently selected from hydrogen and methyl; and each X is independently selected from —O—, —S—, and —NR—, wherein R is selected from hydrogen and methyl;
each $R^2$ is independently selected from $C_{1\text{-}10}$ alkanediyl, $C_{6\text{-}8}$ cycloalkanediyl, $C_{6\text{-}14}$ alkanecycloalkanediyl, and $-[(-CHR^3-)_p-X-]_q-(-CHR^3-)_r-$, wherein p, q, r, $R^3$, and X are as defined as for $R^1$;
m is an integer from 0 to 50;
n is an integer from 1 to 60;
B represents a core of a z-valent, polyfunctionalizing agent B(—V)$_z$ wherein,
z is an integer from 3 to 6; and
each V is a moiety comprising a terminal group reactive with a thiol; and each —V'— is derived from the reaction of —V with a thiol.

In certain embodiments, Formula (2a) and in Formula (2b), $R^1$ is $-[(-CH_2-)_p-X-]_q-(CH_2)_r-$, where p is 2, X is —O—, q is 2, r is 2, $R^2$ is ethanediyl, m is 2, and n is 9.

In certain embodiments of Formula (2a) and Formula (2b), $R^1$ is selected from $C_{2\text{-}6}$ alkanediyl and $-[-(CHR^3)_p-X-]_q-(CHR^3)_r-$.

In certain embodiments of Formula (2a) and Formula (2b), $R^1$ is $-[-(CHR^3)_p-X-]_q-(CHR^3)_r-$, and in certain embodiments X is —O— and in certain embodiments, X is —S—. In certain embodiments of Formula (2a) and Formula (2b), $R^1$ is $-[-(CH_2)_p-X-]_q-(CH_2)_r-$, and in certain embodiments X is —O— and in certain embodiments, X is —S—.

In certain embodiments of Formula (2a) and Formula (2b), where $R^1$ is $-[-(CHR^3)_p-X-]_q-(CHR^3)_r-$, p is 2, r is 2, q is 1, and X is —S—; in certain embodiments, wherein p is 2, q is 2, r is 2, and X is —O—; and in certain embodiments, p is 2, r is 2, q is 1, and X is —O—. In certain embodiments of Formula (2a) and Formula (2b), where $R^1$ is $-[-(CH_2)_p-X-]_q-(CH_2)_r-$, p is 2, r is 2, q is 1, and X is —S—; in certain embodiments, wherein p is 2, q is 2, r is 2, and X is —O—; and in certain embodiments, p is 2, r is 2, q is 1, and X is —O—.

In certain embodiments of Formula (2a) and Formula (2b), where $R^1$ is $-[-(CHR^3)_p-X-]_q-(CHR^3)_r-$, each $R^3$ is hydrogen, and in certain embodiments, at least one $R^3$ is methyl.

In certain embodiments of Formula (2a) and Formula (2b), each $R^1$ is the same, and in certain embodiments, at least one $R^1$ is different.

In certain embodiments, each m is 1, 2, 3, or 4. In certain embodiments, m is an integer from 1 to 10, from 1 to 6, and in certain embodiments, from 1 to 4. In certain embodiments, m is an integer from 2 to 10, from 2 to 6, and in certain embodiments, from 2 to 4. In certain embodiments of Formula (1) m is 1 to 50, in certain embodiments, 2 to 40, and in certain embodiments, 1 to 10.

In certain embodiments of Formula (2a) and Formula (2b), n is an integer from 1 to 30, an integer from 1 to 20, an integer from 1 to 10, and in certain embodiments, and an integer from 1 to 5. In addition, in certain embodiments, n may be any integer from 1 to 60.

In certain embodiments of Formula (2a) and Formula (2b), each p is independently selected from 2, 3, 4, 5, and 6. In certain embodiments, each p is the same and is 2, 3, 4, 5, or 6.

In certain embodiments of Formula (2a) and Formula (2b), each r is selected from 2, 3, 4, 5, 6, 7, and 8.

In certain embodiments of Formula (2a) and Formula (2b), each q is selected from 1, 2, 3, 4, and 5.

Various methods can be used to prepare thiol-terminated polythioethers of Formula (2a) and Formula (2b). Examples of suitable thiol-terminated polythioethers, and methods for their production, are described in U.S. Pat. No. 6,172,179, which is incorporated by reference in its entirety. Such thiol-terminated polythioethers may be difunctional, that is, linear prepolymers having two terminal thiol groups, or polyfunctional, that is, branched prepolymers have three or more terminal thiol groups. Suitable thiol-terminated polythioethers are commercially available, for example, as Permapol® P3.1E, Permapol® L56086, or a combination of any of the foregoing, available from PRC-DeSoto International Inc., Sylmar, Calif.

In certain embodiments, a thiol-terminated polythioether prepolymer may comprise a mixture of different polythioethers and the polythioethers may have the same or different functionality. In certain embodiments, a thiol-terminated polythioether has an average functionality from 2 to 6, from 2 to 4, from 2 to 3, from 2.05 to 2.8, from 2.3 to 2.8, and in certain embodiments, from 2.05 to 2.5. For example, a thiol-terminated polythioether can be selected from a difunctional thiol-terminated polythioether, a trifunctional thiol-terminated polythioether, and a combination thereof.

In certain embodiments, a thiol-terminated polythioether can be prepared by reacting a polythiol and a diene such as a divinyl ether, and the amounts of the respective reactants used to prepare the polythioethers are chosen to yield terminal thiol groups. Thus, in some cases, (n or >n, such as n+1) moles of a polythiol, such as a dithiol or a mixture of at least two different dithiols and about 0.05 moles to 1 moles, such as 0.1 moles to 0.8 moles, of a thiol-terminated polyfunctionalizing agent may be reacted with (n) moles of a diene, such as a divinyl ether, or a mixture of at least two different dienes, such as at least two divinyl ethers. In certain embodiments, a thiol-terminated polyfunctionalizing agent is present in the reaction mixture in an amount sufficient to provide a thiol-terminated polythioether having an average functionality of from 2.05 to 3, such as from 2.1 to 2.8, or from 2.1 to 2.6.

The reaction used to make a thiol-terminated polythioether may be catalyzed by a free radical catalyst. Suitable free radical catalysts include azo compounds, for example azobisnitrile compounds such as azo(bis)isobutyronitrile (AIBN); organic peroxides, such as benzoyl peroxide and t-butyl peroxide; and inorganic peroxides, such as hydrogen peroxide. The reaction can also be effected by irradiation with ultraviolet light either with or without a radical initiator/photosensitizer. Ionic catalysis methods, using either inorganic or organic bases, e.g., triethylamine, may also be used.

Suitable thiol-terminated polythioethers may be produced by reacting a divinyl ether or mixtures of divinyl ethers with an excess of dithiol or a mixtures of dithiols.

Thus, in certain embodiments, a thiol-terminated polythioether comprises the reaction product of reactants comprising:

(a) a dithiol of Formula (3):

HS—$R^1$—SH  (3)

wherein, $R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and -[—(CHR$^3$)$_p$—X—]$_q$—(CHR$^3$)$_r$—; wherein, each $R^3$ is independently selected from hydrogen and methyl;

each X is independently selected from —O—, —S—, —NH—, and —N(—CH$_3$)—;

p is an integer from 2 to 6;

q is an integer from 1 to 5; and r is an integer from 2 to 10; and (b) a divinyl ether of Formula (4):

CH$_2$=CH—O-(—$R^2$—O—)$_m$—CH=CH$_2$  (4)

wherein, m is an integer from 0 to 50;

each $R^2$ is independently selected from $C_{1-10}$ alkanediyl, $C_{6-8}$ cycloalkanediyl, $C_{6-14}$ alkanecycloalkanediyl, and -[(—CHR$^3$—)$_p$—X—]$_q$—(CHR$^3$—)$_r$—, wherein n, p, q, r, $R^3$, and X are as defined for Formula (1).

And, in certain embodiments, the reactants may comprise (c) a polyfunctional compound such as a polyfunctional compound B(—V)$_z$, where B, —V, and z are as defined for Formula (2b).

In certain embodiments, dithiols suitable for use in preparing thiol-terminated polythioethers include those having Formula (3), other dithiols disclosed herein, or combinations of any of the dithiols disclosed herein. In certain embodiments, a dithiol has the structure of Formula (3):

HS—$R^1$—SH  (3)

wherein, $R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and -[—(CHR$^3$)$_p$—X—]$_q$—(CHR$^3$)$_r$—; wherein, each $R^3$ is independently selected from hydrogen and methyl;

each X is independently selected from —O—, —S—, and —NR— wherein R is selected from hydrogen and methyl;

p is an integer from 2 to 6;

q is an integer from 1 to 5; and r is an integer from 2 to 10.

In certain embodiments of a dithiol of Formula (3), $R^1$ is [—(CHR$^3$)$_p$—X—]$_q$—(CHR$^3$)$_r$—.

In certain embodiments of a compound of Formula (16), X is selected from —O— and —S—, and thus -[—(CHR$^3$)$_p$—X—]$_q$—(CHR$^3$)$_r$— in Formula (3) is -[(—CHR$^3$—)$_p$—O—]$_q$—(CHR$^3$)$_r$—, -[(—CHR$^3$—)$_p$—S—]$_q$—(CHR$^3$)$_r$—,

-[(—CH$_2$—)$_p$—O—]$_q$—(CH$_2$)$_r$—, or -[(—CH$_2$—)$_p$—)$_s$—S—]$_q$—(CH$_2$)$_r$—. In certain embodiments, p and r are equal, such as where p and r are both two.

In certain embodiments of a dithiol of Formula (3), R$^1$ is selected from C$_{2-6}$ alkanediyl and -[—(CHR$^3$)$_p$—X—]$_q$—(CHR$^3$)$_r$—.

In certain embodiments of a dithiol of Formula (3), R$^1$ is -[—(CHR$^3$)$_p$—X—]$_q$—(CHR$^3$)$_r$—, and in certain embodiments X is —O—, and in certain embodiments, X is —S—. In certain embodiments of a dithiol of Formula (3), R$^1$ is -[—(CH$_2$)$_p$—X—]$_q$—(CH$_2$)$_r$—, and in certain embodiments X is —O—, and in certain embodiments, X is —S—.

In certain embodiments of a dithiol of Formula (3) where R$^1$ is -[—(CHR$^3$)$_p$—X—]$_q$—(CHR$^3$)$_r$—, p is 2, r is 2, q is 1, and X is —S—; in certain embodiments, wherein p is 2, q is 2, r is 2, and X is —O—; and in certain embodiments, p is 2, r is 2, q is 1, and X is —O—. In certain embodiments of a dithiol of Formula (3) where R$^1$ is -[—(CH$_2$)$_p$—X—]$_q$—(CH$_2$)$_r$—, p is 2, r is 2, q is 1, and X is —S—; in certain embodiments, wherein p is 2, q is 2, r is 2, and X is —O—; and in certain embodiments, p is 2, r is 2, q is 1, and X is —O—.

In certain embodiments of a dithiol of Formula (3) where R$^1$ is -[—(CHR$^3$)$_p$—X—]$_q$—(CHR$^3$)$_r$—, each R$^3$ is hydrogen, and in certain embodiments, at least one R$^3$ is methyl.

In certain embodiments of Formula (3), each R$^1$ is derived from dimercaptodioxaoctane (DMDO) and in certain embodiments, each R$^1$ is derived from dimercaptodiethylsulfide (DMDS).

In certain embodiments of Formula (3), each p is independently selected from 2, 3, 4, 5, and 6. In certain embodiments, each p is the same and is 2, 3, 4, 5, or 6.

In certain embodiments of Formula (3), each r is selected from 2, 3, 4, 5, 6, 7, and 8.

In certain embodiments of Formula (3), each q is selected from 1, 2, 3, 4, and 5.

Examples of suitable dithiols include, for example, 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane, and a combination of any of the foregoing. A polythiol may have one or more pendant groups selected from a lower (e.g., C$_{1-6}$) alkyl group, a lower alkoxy group, and a hydroxy group. Suitable alkyl pendant groups include, for example, C$_{1-6}$ linear alkyl, C$_{3-6}$ branched alkyl, cyclopentyl, and cyclohexyl.

Other examples of suitable dithiols include dimercaptodiethylsulfide (DMDS) (in Formula (3), R$^1$ is -[(—CH$_2$—)$_p$—X—]$_q$—(CH$_2$)$_r$—, wherein p is 2, r is 2, q is 1, and X is —S—); dimercaptodioxaoctane (DMDO) (in Formula (3), R$^1$ is -[(—CH$_2$—)$_p$—X—]$_q$—(CH$_2$)$_r$—, wherein p is 2, q is 2, r is 2, and X is —O—); and 1,5-dimercapto-3-oxapentane (in Formula (3), R$^1$ is -[(—CH$_2$—)$_p$—X—]$_q$—(CH$_2$)$_r$—, wherein p is 2, r is 2, q is 1, and X is —O—). It is also possible to use dithiols that include both a heteroatom in the carbon backbone and a pendant alkyl group, such as a pendant methyl group. Such compounds include, for example, methyl-substituted DMDS, such as HS—CH$_2$CH(CH$_3$)—S—CH$_2$CH$_2$—SH, HS—CH(CH$_3$)CH$_2$—S—CH$_2$CH$_2$—SH and dimethyl substituted DMDS, such as HS—CH$_2$CH(CH$_3$)—S—CHCH$_3$CH$_2$—SH and HS—CH(CH$_3$)CH$_2$—S—CH$_2$CH(CH$_3$)—SH.

Suitable divinyl ethers for preparing thiol-terminated polythioethers include, for example, divinyl ethers of Formula (4):

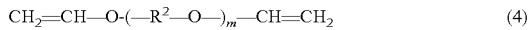

$$CH_2=CH-O-(-R^2-O-)_m-CH=CH_2 \qquad (4)$$

where m is 0 to 50 and R$^2$ in Formula (4) is selected from C$_{2-6}$ n-alkanediyl, C$_{3-6}$ branched alkanediyl, C$_{6-8}$ cycloalkanediyl, C$_{6-10}$ alkanecycloalkanediyl, and -[(—CH$_2$—)$_p$—O—]$_q$-(—CH$_2$—)$_r$—, where p is an integer ranging from 2 to 6, q is an integer from 1 to 5, and r is an integer from 2 to 10. In certain embodiments of a divinyl ether of Formula (4), R$^2$ is C$_{2-6}$ n-alkanediyl, C$_{3-6}$ branched alkanediyl, C$_{6-8}$ cycloalkanediyl, C$_{6-10}$ alkanecycloalkanediyl, and in certain embodiments, -[(—CH$_2$—)$_p$—O—]$_q$-(—CH$_2$—)$_r$—.

Suitable divinyl ethers include, for example, compounds having at least one oxyalkanediyl group, such as from 1 to 4 oxyalkanediyl groups, i.e., compounds in which m in Formula (4) is an integer ranging from 1 to 4. In certain embodiments, m in Formula (4) is an integer ranging from 2 to 4. It is also possible to employ commercially available divinyl ether mixtures that are characterized by a non-integral average value for the number of oxyalkanediyl units per molecule. Thus, m in Formula (4) can also be a rational number values ranging from 0 to 10.0, such as from 1.0 to 10.0, from 1.0 to 4.0, or from 2.0 to 4.0, such as 2.5, which represents an average functionality.

Examples of suitable vinyl ethers include, divinyl ether, ethylene glycol divinyl ether (EG-DVE) (R$^2$ in Formula (4) is ethanediyl and m is 1), butanediol divinyl ether (BD-DVE) (R$^2$ in Formula (4) is butanediyl and m is 1), hexanediol divinyl ether (HD-DVE) (R$^2$ in Formula (4) is hexanediyl and m is 1), diethylene glycol divinyl ether (DEG-DVE) (R$^2$ in Formula (4) is ethanediyl and m is 2), triethylene glycol divinyl ether (R$^2$ in Formula (4) is ethanediyl and m is 3), tetraethylene glycol divinyl ether (R$^2$ in Formula (4) is ethanediyl and m is 4), cyclohexanedimethanol divinyl ether, polytetrahydrofuryl divinyl ether; trivinyl ether monomers, such as trimethylolpropane trivinyl ether; tetrafunctional ether monomers, such as pentaerythritol tetravinyl ether; and combinations of two or more such polyvinyl ether monomers. A polyvinyl ether may have one or more pendant groups selected from alkyl groups, hydroxy groups, alkoxy groups, and amine groups.

In certain embodiments, divinyl ethers in which R$^2$ in Formula (4) is C$_{3-6}$ branched alkanediyl may be prepared by reacting a polyhydroxy compound with acetylene. Examples of branched divinyl ethers include compounds in which R$^2$ in Formula (4) is an alkyl-substituted methanediyl group such as —CH(—CH$_3$)—, for which R$^2$ in Formula (4) is ethanediyl and m is 3 or an alkyl-substituted ethanediyl.

Other useful divinyl ethers include compounds in which R$^2$ in Formula (4) is polytetrahydrofuryl (poly-THF) or polyoxyalkanediyl, such as those having an average of about 3 monomer units.

Two or more types of dithiols and/or polyvinyl ether monomers of Formula (4) may be used. Thus, in certain embodiments, two dithiols of Formula (3) and one polyvinyl ether monomer of Formula (4), one dithiol of Formula (3) and two polyvinyl ether monomers of Formula (4), two dithiols of Formula (3) and two divinyl ether monomers of Formula (4), and more than two compounds of one or both Formula (3) and Formula (4), may be used to produce a variety of thiol-terminated polythioethers.

In certain embodiments, a polyvinyl ether monomer comprises 20 mole percent to less than 50 mole percent of the reactants used to prepare a thiol-terminated polythioether, and in certain embodiments, 30 mole percent to less than 50 mole percent.

In certain embodiments provided by the present disclosure, relative amounts of dithiols and divinyl ethers are selected to yield polythioethers having terminal thiol groups. Thus, a dithiol of Formula (3) or a mixture of at least two different dithiols of Formula (3), can be reacted with of a divinyl ether of Formula (4) or a mixture of at least two different divinyl ethers of Formula (4) in relative amounts such that the molar ratio of thiol groups to alkenyl groups is greater than 1:1, such as from 1.1:1.0 to 2.0:1.0.

The reaction between dithiols and divinyl ethers and/or polythiols and polyvinyl ethers may be catalyzed by a free radical catalyst. Suitable free radical catalysts include, for example, azo compounds, for example azobisnitriles such as azo(bis)isobutyronitrile (AIBN); organic peroxides such as benzoyl peroxide and t-butyl peroxide; and inorganic peroxides such as hydrogen peroxide. The catalyst may be a free-radical catalyst, an ionic catalyst, or ultraviolet radiation. In certain embodiments, the catalyst does not comprise acidic or basic compounds, and does not produce acidic or basic compounds upon decomposition. Examples of free-radical catalysts include azo-type catalyst, such as Vazo®-57 (Du Pont), Vazo®-64 (Du Pont), Vazo®-67 (Du Pont), V-70® (Wako Specialty Chemicals), and V-65B® (Wako Specialty Chemicals). Examples of other free-radical catalysts include alkyl peroxides, such as t-butyl peroxide. The reaction may also be effected by irradiation with ultraviolet light either with or without a cationic photoinitiating moiety.

Thiol-terminated polythioethers provided by the present disclosure may be prepared by combining at least one dithiol of Formula (3) and at least one divinyl ether of Formula (4) followed by addition of an appropriate catalyst, and carrying out the reaction at a temperature from 30° C. to 120° C., such as 70° C. to 90° C., for a time from 2 hours to 24 hours, such as from 2 hours to 6 hours.

As disclosed herein, thiol-terminated polythioethers may comprise a polyfunctional polythioether, i.e., may have an average functionality of greater than 2.0. Suitable polyfunctional thiol-terminated polythioethers include, for example, those having the structure of Formula (2b):

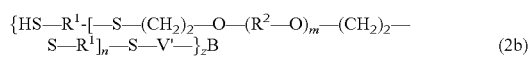

(2b)

wherein z has an average value of greater than 2.0, and, in certain embodiments, a value between 2 and 3, a value between 2 and 4, a value between 3 and 6, and in certain embodiments, is an integer from 3 to 6.

Polyfunctionalizing agents suitable for use in preparing such polyfunctional thiol-terminated polythioethers include trifunctionalizing agents, that is, compounds where z is 3. Suitable trifunctionalizing agents include, for example, triallyl cyanurate (TAC), 1,2,3-propanetrithiol, isocyanurate-containing trithiols, and combinations thereof, as disclosed, for example, in U.S. Publication No. 2010/0010133, which is incorporated by reference in its entirety, and isocyanurates as disclosed, for example, in U.S. Application Publication No. 2011/0319559, which is incorporated by reference in its entirety. Other useful polyfunctionalizing agents include trimethylolpropane trivinyl ether, and the polythiols described in U.S. Pat. Nos. 4,366,307; 4,609,762; and 5,225,472, each of which is incorporated by reference in its entirety. Mixtures of polyfunctionalizing agents may also be used. As a result, polythioethers provided by the present disclosure may have a wide range of average functionality. For example, trifunctionalizing agents may afford average functionalities from 2.05 to 3.0, such as from 2.1 to 2.6. Wider ranges of average functionality may be achieved by using tetrafunctional or higher functionality polyfunctionalizing agents. Functionality may also be determined by factors such as stoichiometry, as will be understood by those skilled in the art.

Polysulfide Prepolymers

Examples of suitable polysulfides are disclosed, for example, in U.S. Pat. Nos. 4,623,711, 6,172,179, 6,509,418, 7,009,032, and 7,879,955, each of which is incorporated by reference in its entirety.

As used herein, the term polysulfide refers to a prepolymer that contains one or more polysulfide linkages, i.e., —$S_x$— linkages, where x is from 2 to 4, in the prepolymer backbone and/or in pendant positions on the prepolymer chain. In certain embodiments, the polysulfide prepolymer will have two or more sulfur-sulfur linkages. Suitable polysulfides are commercially available, for example, from Akzo Nobel and Toray Fine Chemicals under the names Thiokol-LP® and Thioplast®. Thioplast® products are available in a wide range of molecular weights ranging, for example, from less than 1,100 Daltons to over 8,000 Daltons, with molecular weight being the average molecular weight in grams per mole. In some cases, the polysulfide has a number average molecular weight of 1,000 Daltons to 4,000 Daltons. The crosslink density of these products also varies, depending on the amount of crosslinking agent used. The —SH content, i.e., thiol or mercaptan content, of these products can also vary. The mercaptan content and molecular weight of the polysulfide can affect the cure speed of the prepolymer, with cure speed increasing with molecular weight.

In certain embodiments, the sulfur-containing prepolymer curing agent comprises a polysulfide selected from a Thiokol-LP® polysulfide, a Thioplast® polysulfide, and a combination thereof, such as Thioplast® G131, Thioplast® G21 and a combination thereof.

Sulfur-Containing Polyformal Prepolymers

Sulfur-containing polyformal prepolymers useful in aerospace sealant applications are disclosed, for example, in U.S. Application Publication No. 2012/0234205 and in U.S. Application Publication No. 2012/0238707, each of which is incorporated by reference in its entirety.

Low Density Fillers

Compositions and sealants provided by the present disclosure include a polyphenylene sulfide.

Polyphenylene sulfide is a thermoplastic engineering resin that exhibits dimensional stability, chemical resistance, and resistance to corrosive and high temperature environments. Polyphenylene sulfide engineering resins are commercially available, for example, under the tradenames Ryton® (Chevron), Techtron® (Quadrant), Fortron® (Celanese), and Torelina® (Toray). Polyphenylene sulfide resins are generally characterized by a density from about 1.3 g/cc to about 1.4 g/cc, and in certain embodiments about 1.35 g/cc.

For use in compositions provided by the present disclosure, the polyphenylene sulfide filler is characterized by a particle size, for example, from 5 microns to 50 microns, from 5 microns to 75 microns, less than 75 microns, less than 50 microns, and in certain embodiments less than 40 microns.

The polyphenylene sulfide filler can be obtained as pellets and then ground to a fine powder and filtered to obtain a desired nominal particle size and/or desired particle size distribution.

Compositions provided by the present disclosure contain from about 5 wt % to about 40 wt % of a polyphenylene sulfide filler, from 10 wt % to about 35 wt %, and in certain embodiments, from about 20 wt % to about 30 wt % of a polyphenylene sulfide filler, where wt % is based on the total weight of the composition when formulated as a coating or sealant.

In addition to a polyphenylene sulfide filler, compositions provided by the present disclosure may include one or more inorganic fillers. In general, inorganic fillers provide reinforcing effects and sealants incorporating inorganic fillers exhibit excellent fuel resistance, however, because of the high density increase the density of the finished product. For example, a commonly used filler, calcium carbonate, has a density of about 2.7 g/cc. In sulfur-containing prepolymer-based compositions and sealants, calcium carbonate can be used in amounts from about 20 wt % to 40 wt % based on the total weight of the formulation. In the present compositions and formulations, all or a part of the inorganic filler can be replaced with polyphenylene sulfide filler to obtain a low-density composition. In addition to calcium carbonate, examples of other suitable inorganic fillers include carbon black.

Compositions

Coatings and sealant formulations may be provided as a one-part or a two-part composition depending on the curing chemistry. For example, a one-part system may be appropriate for a UV curable system in which all components are combined and stored prior to use and subsequently activated upon exposure to UV. In other formulations, such as appropriate in thiol-epoxy curing chemistries, two-part systems may be used. In a two-part system a base component can contain a thiol-terminated sulfur-containing prepolymer and an accelerator component can include a polyepoxy curing agent. Either or both the base component and the accelerator component may include a low density filler. In certain embodiments, the base component contains a polyphenylene sulfide filler. In certain embodiments, the base component contains a polyphenylene sulfide filler and an inorganic filler such as calcium carbonate. In certain embodiments, the accelerator component contains an inorganic filler such as calcium carbonate. In addition to the sulfur-containing prepolymer and polyphenylene sulfide filler, the base component may also contain a suitable catalyst. In addition to a curing agent, the accelerator component may also contain one or more additional components such as pigment, adhesion promoters, and plasticizers.

In certain embodiments, a coating or sealant formulation contains from about 75 wt % to about 95 wt % of the base component, from about 80 wt % to about 90 wt % of the base component and in certain embodiments, from about 82 wt % to about 88 wt % of the base component, where wt % is based on the total weight of the formulation.

In certain embodiments, a base component contains from about 50 wt % to about 80 wt % of a sulfur-containing prepolymer, from 55 wt % to about 75 wt %, and in certain embodiments, from about 55 wt % to about 70 wt % of a sulfur-containing prepolymer, where wt % is based on the total weight of the base component.

In certain embodiments, a base component contains from about 10 wt % to about 50 wt % of the polyphenylene sulfide filler, from 15 wt % to about 45 wt %, and in certain embodiments, from about 15 wt % to about 40 wt % of the polyphenylene sulfide filler, where wt % is based on the total weight of the base component. In embodiments in which the only filler in the base component is polyphenylene sulfide, the base components contains from about 30 wt % to about 40 wt % polyphenylene sulfide filler, where wt % is based on the total weight of the base component.

In certain embodiments, a base component may contain a polyphenylene sulfide filler and an inorganic filler. In such formulations, the total amount of filler in the base component can range from about 30 wt % to about 45 wt %, from about 35 wt % to about 45 wt %, and in certain embodiments, from about 35 wt % to about 40 wt %. In certain embodiments, the wt % of polyphenylene sulfide filler and inorganic filler can be about the same such as from about 15 wt % to about 20 wt %.

The accelerator component may or may not contain a filler. In certain embodiments, the accelerator component contains from about 10 wt % to about 35 wt % of a filler and in certain embodiments, from about 15 wt % to about 30 wt % of a filler.

When combined to provide a coating or sealant formulation, the formulation may comprise from about 45 wt % to about 70 wt % of a sulfur-containing prepolymer and in certain embodiments from about 50 wt % to about 65 wt % of a sulfur-containing prepolymer, where wt % is based on the total weight of the formulation.

In certain embodiments, a formulation contains from 25 wt % to about 45 wt % filler, from about 25 wt % to about 35 wt %. and in certain embodiments from about 30 wt % to about 40 wt % filler where wt % is based on the total weight of the formulation. The filler may be polyphenylene sulfide or may be a combination of polyphenylene sulfide and an inorganic filler such as calcium carbonate. In certain embodiments, in addition to the polyphenylene sulfide filler, a formulation may contain from about 1 wt % to about 30 wt % of an inorganic filler, from about 5 wt % to about 25 wt %, from about 1 wt % to about 10 wt %, from about 1 wt % to about 5 wt %, from about 0 wt % to about 10 wt %, and in certain embodiments, from about 15 wt % to about 25 wt % of an inorganic filler.

Curing Agent

Compositions and formulations provided by the present disclosure may include a suitable curing agent. The suitability of a particular curing agent can depend in part on the curing chemistry employed. In certain embodiments, a suitable curing agent comprises a polyepoxy curing agent.

Polyepoxy

In certain embodiments, compositions provided by the present disclosure comprise a polyepoxy curing agent. Examples of suitable polyepoxy curing agents include, for example, polyepoxide resins such as hydantoin diepoxide, diglycidyl ether of bisphenol-A, diglycidyl ether of bisphenol-F, Novolac® type epoxides such as DEN™ 438, certain epoxidized unsaturated resins, and combinations of any of the foregoing. A polyepoxide refers to a compound having two or more reactive epoxy groups.

In certain embodiments, a polyepoxy comprises a polyepoxy selected from a Novolac® epoxy resin such as DEN® 431, a bisphenol A/epichlorohydrin derived epoxy resin such as EPON® 828, or a combination thereof.

In certain embodiments, a polyepoxy curing agent comprises an epoxy-functional prepolymer. Examples of suitable epoxy-functional prepolymers include the epoxy-functional sulfur-containing polyformal prepolymers disclosed in U.S. Publication No. 2012/0238707 and epoxy-functional polythioether prepolymers disclosed in U.S. Pat. No. 7,671,145. In general, when used as a curing agent, an epoxy-functional prepolymer has a molecular weight less than about 2,000 Daltons, less than about 1,500, Daltons, less than about 1,000 Daltons, and in certain embodiments, less than about 500 Daltons. Epoxy-functional sulfur-containing prepolymers may be formed, for example, by reacting a thiol-functional sulfur-containing prepolymer with a diepoxide or with an epoxy olefin.

In such compositions, a polyepoxy curing agent may comprise about 0.5 wt % to about 20 wt % of the composition, from about 1 wt % to about 10 wt %, from about 2 wt % to about 8 wt %, from about 2 wt % to about 6 wt %, and in certain embodiments, from about 3 wt % to about 5 wt %, where wt % is based on the total solids weight of the composition.

Catalyst

Compositions provided by the present disclosure may include one or more suitable catalysts. A catalyst can be selected as appropriate for the curing chemistry employed. In certain embodiments, for example, when curing thiol-terminated sulfur-containing prepolymer and polyepoxides, the catalyst can be an amine catalyst. A cure catalyst may be present, for example, in an amount from 0.1 to 5 weight percent, based on the total weight of the composition. Examples of suitable catalysts include 1,4-diazabicyclo [2.2.2]octane (DABCO®, commercially available from Air Products, Chemical Additives Division, Allentown, Pa.) and DMP-30® (an accelerant composition including 2,4,6-tris (dimethylaminomethyl)phenol. Other examples of suitable amine catalysts include, dimethylcyclohexylamine (DM-CHA), dimethylethanolamine (DMEA), bis-(2-dimethylaminoethyl)ether, N-ethylmorpholine, triethylamine, 1,8-diazabicyclo[5.4.0]undecene-7 (DBU), pentamethyldiethylenetriamine (PMDETA), benzyldimethylamine (BDMA), N,N,N'-trimethyl-N'-hydroxyethyl-bis (aminoethyl)ether, and N'-(3-(dimethylamino)propyl)-N,N-dimethyl-1,3-propanediamine.

Other Components

Compositions provided by the present disclosure may comprise one or more additional components suitable for use in aerospace sealants and the selection of suitable additional components can depend at least in part on the desired performance characteristics of the cured sealant under conditions of use.

In certain embodiments, a composition provided by the present disclosure comprises an ethylenically unsaturated silane, such as, for example, a sulfur-containing ethylenically unsaturated silane, which can improve the adhesion of a cured sealant to a metal substrate. As used herein, the term sulfur-containing ethylenically unsaturated silane refers to a molecular compound that comprises, within the molecule, (i) at least one sulfur (S) atom, (ii) at least one, in some cases at least two, ethylenically unsaturated carbon-carbon bonds, such as a carbon-carbon double bonds (C═C); and (iii) at least one silane group, —Si(—R)$_m$(—OR)$_{3-m}$, where each R is independently selected from hydrogen, alkyl, cycloalkyl, aryl, and others, and m is selected from 0, 1, and 2. Examples of ethylenically unsaturated silanes are disclosed in U.S. Publication No. 2012/0040104, which is incorporated by reference in its entirety.

In certain embodiments, compositions provided by the present disclosure comprise one or more than one adhesion promoters. A one or more additional adhesion promoter may be present in amount from 0.1 wt % to 15 wt % of a composition, less than 5 wt %, less than 2 wt %, and in certain embodiments, less than 1 wt %, based on the total dry weight of the composition. Examples of adhesion promoters include phenolics, such as Methylon® phenolic resin, and organosilanes, such as epoxy, mercapto or amino functional silanes, such as Silquest® A-187 and Silquest® A-1100. Other useful adhesion promoters are known in the art. In certain embodiments, the adhesion promoter includes T-1601, available from PRC-DeSoto International.

In certain embodiments, compositions and sealants provided by the present disclosure may also contain an adhesion promoter such as sulfur-containing adhesion promoter. Useful sulfur-containing adhesion promoters are disclosed in U.S. Pat. No. 8,513,339. Such adhesion promoters comprise the reaction product of a sulfur-containing compound such as DMDO and a trifunctionalizing agent such as TAC and having at least some terminal thiol groups and some terminal mercaptosilane groups.

Compositions provided by the present disclosure may comprise one or more different types of filler. Suitable fillers include those commonly known in the art, including inorganic fillers, such as carbon black and calcium carbonate (CaCO$_3$), silica, polymer powders, and lightweight fillers. Suitable lightweight fillers include, for example, those described in U.S. Pat. No. 6,525,168. In certain embodiments, a composition includes 5 wt % to 60 wt % of the filler or combination of fillers, 10 wt % to 50 wt %, and in certain embodiments, from 20 wt % to 40 wt %, based on the total dry weight of the composition.

In addition to polyphenylene sulfide, in certain embodiments, compositions and sealants provided by the present disclosure may include one or more additional light weight, low density fillers. In certain embodiments, compositions provided by the present disclosure include other low density filler particles. As used herein, low density, when used with reference to such particles means that the particles are characterized by a specific gravity of no more than 0.7, in certain embodiments no more than 0.25, and in certain embodiments, no more than 0.1. Suitable lightweight filler particles often fall within two categories—microspheres and amorphous particles. The specific gravity of microspheres may range from 0.1 to 0.7 and include, for example, polystyrene foam, microspheres of polyacrylates and polyolefins, and silica microspheres having particle sizes ranging from 5 microns to 100 microns and a specific gravity of 0.25 (Eccospheres®). Other examples include alumina/silica microspheres having particle sizes in the range of 5 microns to 300 microns and a specific gravity of 0.7 (Fillite®), aluminum silicate microspheres having a specific gravity of from about 0.45 to about 0.7 (Z-Light®), calcium carbonate-coated polyvinylidene copolymer microspheres having a specific gravity of 0.13 (Dualite® 6001AE), and calcium carbonate coated acrylonitrile copolymer microspheres such as Dualite® E135, having an average particle size of about 40 μm and a density of 0.135 g/cc (Henkel). Suitable fillers for decreasing the specific gravity of the composition include, for example, hollow microspheres such as Expancel® microspheres (available from AkzoNobel) or Dualite® low density polymer microspheres (available from Henkel). In certain embodiments, compositions provided by the present disclosure include lightweight filler particles comprising an exterior surface coated with a thin coating, such as those described in U.S. Publication No. 2010/0041839, which is incorporated by reference in its entirety.

In certain embodiments, an additional low density filler comprises less than 2 wt % of a composition, less than 1.5 wt %, less than 1.0 wt %, less than 0.8 wt %, less than 0.75 wt %, less than 0.7 wt % and in certain embodiments, less than 0.5 wt % of a composition, where wt % is based on the total dry solids weight of the composition.

In certain embodiments, compositions provided by the present disclosure comprise at least one filler that is effective in reducing the specific gravity of the composition. In certain embodiments, the specific gravity of a composition is from 0.8 to 1, from 0.7 to 0.9, from 0.75 to 0.85, and in certain embodiments, is about 0.8. In certain embodiments, the specific gravity of a composition is less than about 0.9, less than about 0.8, less than about 0.75, less than about 0.7, less than about 0.65, less than about 0.6, and in certain embodiments, less than about 0.55.

A composition may also include any number of additional additives as appropriate for a certain application. Examples of suitable additives include plasticizers, pigments, surfactants, adhesion promoters, thixotropic agents, fire retardants, masking agents, and accelerators (such as amines, including 1,4-diaza-bicyclo[2.2.2] octane, DABCO®), and combinations of any of the foregoing. When used, the additives may be present in a composition in an amount ranging, for example, from about 0 wt % to 60 wt %. In certain embodiments, additives may be present in a composition in an amount ranging from about 25 wt % to 60 wt %.

Uses

Compositions provided by the present disclosure may be used, for example, in sealants, coatings, encapsulants, and potting compositions. A sealant includes a composition capable of producing a film that has the ability to resist operational conditions, such as moisture and temperature, and at least partially block the transmission of materials, such as water, fuel, and other liquid and gases. A coating composition includes a covering that is applied to the surface of a substrate to, for example, improve the properties of the substrate such as the appearance, adhesion, wettability, corrosion resistance, wear resistance, fuel resistance, and/or abrasion resistance. A potting composition includes a material useful in an electronic assembly to provide resistance to shock and vibration and to exclude moisture and corrosive agents. In certain embodiments, sealant compositions provided by the present disclosure are useful, e.g., as aerospace sealants including as linings for fuel tanks.

In certain embodiments, compositions containing thiol-terminated polythioether prepolymers are formulated as sealants.

In certain embodiments, compositions, such as sealants, may be provided as multi-pack compositions, such as two-pack compositions, wherein one package comprises one or more thiol-terminated sulfur-containing prepolymers provided by the present disclosure and a second package comprises one or more polyepoxy curing agent. Additives and/or other materials may be added to either package as desired or necessary. The two packages may be combined and mixed prior to use.

In certain embodiments, the pot life of the one or more mixed thiol-terminated sulfur-containing prepolymers and polyepoxies is at least 30 minutes, at least 1 hour, at least 2 hours, and in certain embodiments, more than 2 hours, where pot life refers to the period of time the mixed composition remains suitable for use as a sealant after mixing.

Compositions, including sealants, provided by the present disclosure may be applied to any of a variety of substrates. Examples of substrates to which a composition may be applied include metals such as titanium, stainless steel, and aluminum, any of which may be anodized, primed, organic-coated or chromate-coated; epoxy; urethane; graphite; fiberglass composite; Kevlar®; acrylics; and polycarbonates. The substrate may be cleaned and/or treated with a primer such as a corrosion resistant primer or with an adhesion promoting composition prior to application of the sealant. In certain embodiments, compositions provided by the present disclosure may be applied to a coating on a substrate, such as a polyurethane coating.

Compositions provided by the present disclosure may be applied directly onto the surface of a substrate or over an underlayer by any suitable coating process.

Furthermore, methods are provided for sealing aperture surface utilizing a composition provided by the present disclosure. These methods comprise, for example, applying a sealant provided by the present disclosure to a surface to seal an surface, and curing the sealant. In certain embodiments, a method for sealing a surface comprises applying a sealant composition provided by the present disclosure to surfaces defining a surface and curing the sealant, to provide a sealed surface.

In certain embodiments, a composition may be cured under ambient conditions, where ambient conditions refers to a temperature from 20° C. to 25° C., and atmospheric humidity. In certain embodiments, a composition may be cured under conditions encompassing a temperature from a 0° C. to 100° C. and humidity from 0% relative humidity to 100% relative humidity. In certain embodiments, a composition may be cured at a higher temperature such as at least 30° C., at least 40° C., and in certain embodiments, at least 50° C. In certain embodiments, a composition may be cured at room temperature, e.g., 25° C. In certain embodiments, a composition may be cured upon exposure to actinic radiation, such as ultraviolet radiation.

In certain embodiments, a sealant achieves a tack-free cure in less than about 2 hours, less than about 4 hours, less than about 6 hours, less than about 8 hours, and in certain embodiments, less than about 10 hours, at a temperature of less than about 200° F.

The time to form a viable seal using curable compositions of the present disclosure can depend on several factors as can be appreciated by those skilled in the art, and as defined by the requirements of applicable standards and specifications. In general, curable compositions of the present disclosure develop adhesion strength within 24 hours to 30 hours, and 90% of full adhesion strength develops from 2 days to 3 days, following mixing and application to a surface. In general, full adhesion strength as well as other properties of cured sealants of the present disclosure becomes fully developed within 7 days following mixing and application of a curable composition to a surface.

Properties

Compositions and formulations provided by the present disclosure are characterized by a low density. For example, in certain embodiments, a composition or formulation is characterized by a specific gravity from about 1.15 to about 1.35, from about 1.15 to about 1.30, from about 1.15 to 1.25, and in certain embodiments from about 1.20 to about 1.30.

For aerospace sealant applications it can be desirable that a sealant meet the requirements of Mil-S-22473E (Sealant Grade C) at a cured thickness of 20 mils, exhibit an elongation greater than 200%, a tensile strength greater than 250 psi, and excellent fuel resistance, and maintain these properties over a wide temperature range from −67° F. to 360° F. In general, the visual appearance of a cured sealant is not an important attribute. Prior to cure, it is desirable that the mixed components have a useful working time or pot life of at least 24 hours and have a cure time within 24 hours of the pot life. Useful working time or pot life refers to the time period the composition remains workable for application at ambient temperatures after the catalyst is released. In certain embodiments, compositions provided by the present disclosure have a pot life of at least 6 hours, at least 12 hours, at least 18 hours, at least 24 hours, and in certain embodiments, more than 24 hours. In certain embodiments, compositions provided by the present disclosure cure in less than 6 hours after the pot life, in less than 12 hours, in less than 18 hours, in less than 24 hours, in less than 48 hours, and in certain embodiments, in less than 72 hours after useful working time.

Cured compositions disclosed herein, such as cured sealants, exhibit properties acceptable for use in aerospace applications. In general, it is desirable that sealants used in aviation and aerospace applications exhibit the following properties: peel strength greater than 20 pounds per linear inch (pli) on Aerospace Material Specification (AMS) 3265B substrates determined under dry conditions, following immersion in JRF Type I for 7 days, and following immersion in a solution of 3% NaCl according to AMS 3265B test specifications; tensile strength between 300 pounds per square inch (psi) and 400 psi; tear strength greater than 50 pounds per linear inch (pli); elongation between 250% and 300%; and hardness greater than 40 Durometer A. These and other cured sealant properties appropriate for aviation and aerospace applications are disclosed in AMS 3265B, which is incorporated by reference in its entirety. It is also desirable that, when cured, compositions of the present disclosure used in aviation and aircraft applications exhibit a percent volume swell not greater than 25% following immersion for one week at 60° C. (140° F.) and ambient pressure in JRF Type I. Other properties, ranges, and/or thresholds may be appropriate for other sealant applications.

In certain embodiments, compositions provided by the present disclosure are fuel-resistant. As used herein, the term "fuel resistant" means that a composition, when applied to a substrate and cured, can provide a cured product, such as a sealant, that exhibits a percent volume swell of not greater than 40%, in some cases not greater than 25%, in some cases not greater than 20%, in yet other cases not more than 10%, after immersion for one week at 140° F. (60° C.) and ambient pressure in Jet Reference Fluid (JRF) Type I according to methods similar to those described in ASTM D792 (American Society for Testing and Materials) or AMS 3269 (Aerospace Material Specification). Jet Reference Fluid JRF Type I, as employed for determination of fuel resistance, has the following composition: toluene: 28%±1% by volume; cyclohexane (technical): 34%±1% by volume; isooctane: 38%±1% by volume; and tertiary dibutyl disulfide: 1%±0.005% by volume (see AMS 2629, issued Jul. 1, 1989, §3.1.1 etc., available from SAE (Society of Automotive Engineers)).

In certain embodiments, compositions provided herein provide a cured product, such as a sealant, exhibiting a tensile elongation of at least 100% and a tensile strength of at least 400 psi when measured in accordance with the procedure described in AMS 3279, §3.3.17.1, test procedure SAE AS5127/1, §7.7.

In certain embodiments, the tensile strength and elongation of a cured sealant is measured according to ASTM D412 and the hardness and fuel swell is measured according to SAE As 5127/1B.

In certain embodiments, a cured sealant comprising a composition provided by the present disclosure meets or exceeds the requirements for aerospace sealants as set forth in AMS 3277.

Sealed surfaces, including surface of aerospace vehicles, sealed with compositions and sealants provided by the present disclosure are also disclosed.

EXAMPLES

Embodiments provided by the present disclosure are further illustrated by reference to the following examples, which describe prepolymer compositions and sealants provided by the present disclosure. It will be apparent to those skilled in the art that many modifications, both to materials, and methods, may be practiced without departing from the scope of the disclosure.

Example 1

Sealant Composition

A sealant composition consists of two parts, a polymer blend with a polyphenylene sulfide filler and an accelerator. The polymer blend composition is shown in Table 1-1 and the accelerator composition is shown in Table 1-2.

TABLE 1-1

Polymer Blend of Example 1.

| Component | Weight, g |
|---|---|
| Permapol ® polymer*, L1633 | 14.26 |
| Permapol ® polymer*, L56086 | 3.55 |
| Polyphenylene sulfide, Ryton ® V-1** | 10.824 |
| DABCO ® 33-LV† | 0.33 |

The above ingredients were mixed and the mixture kept at room temperature for 24 hours before mixing with the accelerator.

TABLE 1-2

Accelerator Composition of Example 1.

| Component | Weight, g |
|---|---|
| Adhesion promoter* | 5.7 |
| Calcium carbonate** | 50.4 |
| Plasticizer | 40 |
| Carbon black | 24 |

TABLE 1-2-continued

Accelerator Composition of Example 1.

| Component | Weight, g |
|---|---|
| Epoxy resin, DEN ® 431† | 50 |
| Epoxy resin, Epon ® 828§ | 50 |

*Adhesion promoter, as T-1601, available from PRC-DeSoto Intrrnational, Inc.
**CaCO$_3$, Winnofil ® SPM from Solvay Chemicals.
†Bisphenol A/epichlorohydrinpolyepoxy resin available from Momentive Performance Materials.
§Novolac polyepoxy resin available from Dow Chemical.

The above ingredients were mixed and the mixture was kept at room temperature for 24 hours before mixing with the base.

A sealant was prepared by mixing the polymer blend with 4.76 g of the accelerator and the sealant was left at room temperature to cure.

The tensile strength and elongation of the cured sealant was measured according to ASTM D412 for the unexposed samples and for samples that were exposed to Jet Reference Fluid Type I. In addition, fuel swell and hardness were measured according to SAE AS5127/1B. The results are shown in Table 11.

Example 2

Sealant Composition

The polymer blend composition shown in Table 2-1 and the accelerator composition is shown in Table 2-2.

TABLE 2-1

Polymer Blend of Example 2.

| Component | Weight, g |
|---|---|
| Permapol ® polymer*, L1633 | 14.26 |
| Permapol ® polymer*, L56086 | 3.55 |
| Polyphenylene sulfide, Ryton ® P-6** | 10.82 |
| DABCO ® 33-LV | 0.33 |

*Permapol ® polymer is available from PRC-DeSoto International, Inc.
**Polyphenylene sulfide P-6 available from Chevron Phillips Chemical Company.

The polymer blend components were mixed and the mixture was kept at room temperature for 24 hours before mixing with the accelerator.

TABLE 2-2

Accelerator Composition of Example 2.

| Component | Weight, g |
|---|---|
| Adhesion promoter* | 5.7 |
| Calcium carbonate | 50.4 |
| Plasticizer | 40 |
| Carbon black | 24 |
| Epoxy resin, DEN ® 431 | 50 |
| Epoxy resin, Epon ® 828 | 50 |

*Adhesion promoter, as T-1601, is available from PRC-DeSoto International, Inc.

The accelerator components were mixed and the mixture kept at room temperature for 24 hours before mixing with the base.

A sealant was prepared by mixing the polymer blend with 4.76 g of the accelerator and the sealant cured at room temperature.

The tensile strength and elongation of the cured sealant were measured according to ASTM D412 for the unexposed samples and for samples that were exposed to Jet Reference Fluid Type I. In addition, fuel swell and hardness were measured according to SAE AS5127/1B. The results are shown in Table 11.

Example 3

Comparative Sealant Composition

The polymer blend composition is shown in Table 3-1 and the accelerator composition is shown in Table 3-2.

TABLE 3-1

Polymer Blend of Comparative Example 3.

| Component | Weight, g |
|---|---|
| Permapol ® polymer*, L1633 | 14.26 |
| Permapol ® polymer*, L56086 | 3.55 |
| Orgasol ® 1002D** | 10.824 |
| DABCO ® 33-LV | 0.33 |

*Permapol ® polymer is available from PRC-DeSoto International, Inc.
**Orgasol 1002D is a spheroidal powder of polyamide with a 20 µm average diameter with a density of 0.425 g/cc available from Arkema.

The accelerator components were mixed and the mixture kept at room temperature for 24 hours before mixing with the accelerator.

TABLE 3-2

Accelerator Composition of Comparative Example 3.

| Component | Weight, g |
|---|---|
| Adhesion promoter* | 5.7 |
| Calcium carbonate | 50.4 |
| Plasticizer | 40 |
| Carbon black | 24 |
| Epoxy resin, DEN ® 431 | 50 |
| Epoxy resin, Epon ® 828 | 50 |

*Adhesion promoter, as T-1601, is available from PRC-DeSoto International, Inc.

The above ingredients were mixed and the mixture kept at room temperature for 24 hours before mixing with the base.

A sealant was prepared by mixing the polymer blend with 4.76 g of the accelerator and the sealant cured at room temperature.

The tensile strength and elongation of the cured sealant were measured according to ASTM D412 for the unexposed samples and for samples that were exposed to Jet Reference Fluid Type I. In addition, fuel swell and hardness were measured according to SAE AS5127/1B. The results are shown in Table 11.

Example 4

Comparative Sealant Composition

The polymer blend composition is shown in Table 4-1 and the accelerator composition is shown in Table 4-2.

TABLE 4-1

Polymer Blend of Comparative Example 4.

| Component | Weight, g |
|---|---|
| Permapol ® polymer*, L1633 | 18.14 |
| Permapol ® polymer*, L56086 | 4.52 |
| Calcium carbonate | 13.78 |
| DABCO ® 33-LV | 0.42 |

*Permapol ® polymer is available from PRC-DeSoto International, Inc.

The polymer blend components were mixed and the mixture kept at room temperature for 24 hours before mixing with the accelerator.

TABLE 4-2

Accelerator Composition of Comparative Example 4.

| Component | Weight, g |
|---|---|
| Adhesion promoter* | 5.7 |
| Calcium carbonate | 50.4 |
| Plasticizer | 40 |
| Carbon black | 24 |
| Epoxy resin, DEN ® 431 | 50 |
| Epoxy resin, Epon ® 828 | 50 |

*Adhesion promoter, as T-1601, is available from PRC-DeSoto International, Inc.

The accelerator components were mixed and the mixture kept at room temperature for 24 hours before mixing with the base.

A sealant was prepared by mixing the polymer blend with 6.06 g of the accelerator and the sealant cured at room temperature.

The tensile strength and elongation of the cured sealant were measured according to ASTM D412 for the unexposed samples and for samples that were exposed to Jet Reference Fluid Type I. In addition, fuel swell and hardness were measured according to SAE AS5127/1B. The results are shown in Table 11.

Example 5

Sealant Composition

The polymer blend composition is shown in Table 5-1. The accelerator includes T-0644, a manganese dioxide paste that is commercially available from PRC-DeSoto International, Inc. T-0644 contains about 54% manganese dioxide and other additives.

TABLE 5-1

Polymer Blend of Example 5.

| Component | Weight, g |
|---|---|
| Thioplast ® G-131* | 15.00 |
| Thioplast ® G-21* | 15.00 |
| Polyphenylene sulfide, Ryton ® P-6 | 15.00 |

*Thioplast ® is thiol-terminated polysulfide polymer available from Akzo Nobel.

The polymer blend components were mixed and the mixture kept at room temperature for 24 hours before mixing with the accelerator.

A sealant was prepared by mixing the polymer blend with 5.00 g of the accelerator and the sealant cured at room temperature.

The tensile strength and elongation of the cured sealant were measured according to ASTM D412 for the unexposed samples and for samples that were exposed to Jet Reference Fluid Type I. In addition, fuel swell and hardness were measured according to SAE AS5127/1B. The results are shown in Table 11.

Example 6

Sealant Composition

The polymer blend composition is shown in Table 6-1. The accelerator is T-0644, a manganese dioxide paste that is commercially available from PRC-DeSoto International, Inc. T-0644 contains about 54% manganese dioxide and other additives.

TABLE 2-1

Polymer Blend of Example 6.

| Component | Weight, g |
|---|---|
| Thioplast ® G-131* | 15.00 |
| Thioplast ® G-21* | 15.00 |
| Polyphenylene sulfide, Ryton ® V-1 | 15.00 |

*Thioplast ® is thiol-terminated polysulfide polymer available from Akzo Nobel.

The polymer blend components were mixed and the mixture kept at room temperature for 24 hours before mixing with the accelerator.

A sealant was prepared by mixing the polymer blend with 5.00 g of the accelerator and the sealant cured at room temperature.

The tensile strength and elongation of the cured sealant were measured according to ASTM D412 for the unexposed samples and for samples that were exposed to Jet Reference Fluid Type I. In addition, fuel swell and hardness were measured according to SAE AS5127/1B. The results are shown in Table 11.

Example 7

Comparative Sealant Composition

The polymer blend composition is shown in Table 7-1. The accelerator is T-0644, a manganese dioxide paste that is commercially available from PRC-DeSoto International, Inc. T-0644 contains about 54% manganese dioxide and other additives.

TABLE 2-1

Polymer Blend of Comparative Example 7.

| Component | Weight, g |
|---|---|
| Thioplast ® G-131* | 15.00 |
| Thioplast ® G-21* | 15.00 |
| Orgasol ® 1002D | 15.00 |

*Thioplast ® is thiol-terminated polysulfide polymer available from Akzo Nobel.

The polymer blend components were mixed and the mixture kept at room temperature for 24 hours before mixing with the accelerator.

A sealant was prepared by mixing the polymer blend with 5.00 g of the accelerator and the sealant cured at room temperature.

The tensile strength and elongation of the cured sealant were measured according to ASTM D412 for the unexposed samples and for samples that were exposed to Jet Reference Fluid Type I. In addition fuel swell and hardness were measured according to SAE AS5127/1B. The results are shown in Table 11.

Example 8

Comparative Sealant Composition

The polymer blend composition is shown in Table 8-1. The accelerator is T-0644, a manganese dioxide paste that is commercially available from PRC-DeSoto International, Inc. T-0644 contains about 54% manganese dioxide and other additives.

TABLE 2-1

Polymer Blend of Comparative Example 8.

| Component | Weight, g |
| --- | --- |
| Thioplast ® G-131* | 15.00 |
| Thioplast ® G-21* | 15.00 |
| Calcium carbonate | 15.00 |

*Thioplast ® is thiol-terminated polysulfide polymer available from Akzo Nobel.

The polymer blend components were mixed and the mixture kept at room temperature for 24 hours before mixing with the accelerator.

A sealant was prepared by mixing the polymer blend with 5.00 g of the accelerator and the sealant cured at room temperature.

The tensile strength and elongation of the cured sealant were measured according to ASTM D412 for the unexposed samples and for samples that were exposed to Jet Reference Fluid Type I. In addition, fuel swell and hardness were measured according to SAE AS5127/1B. The results are shown in Table 11.

Example 9

Sealant Composition

The polymer blend composition is shown in Table 9-1 and the accelerator composition is shown in Table 9-2.

TABLE 9-1

Polymer Blend of Example 9.

| Component | Weight, g |
| --- | --- |
| Permapol ® polymer*, L1633 | 18.14 |
| Permapol ® polymer*, L56086 | 4.52 |
| Polyphenylene sulfide, Ryton ® V-1 | 6.89 |
| Calcium carbonate | 6.89 |
| DABCO ® 33-LV | 0.42 |

*Permapol ® polymer is available from PRC-DeSoto International, Inc.

The polymer blend components were mixed and the mixture kept at room temperature for 24 hours before mixing with the accelerator.

TABLE 9-2

Accelerator Composition of Example 9.

| Composition | Weight, g |
| --- | --- |
| Adhesion promoter* | 5.7 |
| Calcium carbonate | 50.4 |
| Plasticizer | 40 |
| Carbon black | 24 |
| Epoxy resin, DEN ® 431 | 50 |
| Epoxy resin, Epon ® 828 | 50 |

*Adhesion promoter, as T-1601, is available from PRC-DeSoto International, Inc.

The accelerator components were mixed and the mixture kept at room temperature for 24 hours before mixing with the base.

A sealant was prepared by mixing the polymer blend with 6.06 g of the accelerator and the sealant cured at room temperature.

The tensile strength and elongation of the cured sealant were measured according to ASTM D412 for the unexposed samples and for samples that were exposed to Jet Reference Fluid Type I. In addition fuel swell and hardness were measured according to SAE AS5127/1B. The results are shown in Table 11.

Example 10

Sealant Composition

The polymer blend composition is shown in Table 10-1 and the accelerator composition is shown in Table 10-2.

TABLE 10-1

Polymer Blend of Example 10.

| Composition | Weight, g |
| --- | --- |
| Permapol ® polymer*, L1633 | 18.14 |
| Permapol ® polymer*, L56086 | 4.52 |
| Polyphenylene sulfide, Ryton ® P-6 | 6.89 |
| Calcium carbonate | 6.89 |
| DABCO ® 33-LV | 0.42 |

*Permapol ® polymer is available from PRC-DeSoto International, Inc.

The polymer blend components were mixed and the mixture kept at room temperature for 24 hours before mixing with the accelerator.

TABLE 10-2

Accelerator Composition of Example 10.

| Component | Weight, g |
| --- | --- |
| Adhesion promoter* | 5.7 |
| Calcium carbonate | 50.4 |
| Plasticizer | 40 |
| Carbon black | 24 |
| Epoxy resin, DEN ® 431 | 50 |
| Epoxy resin, Epon ® 828 | 50 |

*Adhesion promoter, as T-1601, is available from PRC-DeSoto International, Inc.

The accelerator components were mixed and the mixture kept at room temperature for 24 hours before mixing with the base.

A sealant was prepared by mixing the polymer blend with 6.06 g of the accelerator and the sealant cured at room temperature.

The tensile strength and elongation of the cured sealant were measured according to ASTM D412 for the unexposed samples and for samples that were exposed to Jet Reference Fluid Type I. In addition, fuel swell and hardness were measured according to SAE AS5127/1B. The results are shown in Table 11.

TABLE 11

Results.

| Sealant | Specific Gravity | Hardness, Shore A | | Tensile Strength, psi | | Elongation, % | | Fuel Swell**, % |
|---|---|---|---|---|---|---|---|---|
| | | Before Fuel Exposure | After Fuel Exposure* | No Fuel Exposure | After Fuel Exposure* | No Fuel Exposure | After Fuel Exposure* | |
| Example 1† | 1.19 | 48 | 41 | 167 | 140 | 173 | 154 | 12.33 |
| Example 2† | 1.18 | 43 | 34 | 134 | 95 | 181 | 188 | 11.01 |
| Comparative Example 3† | 1.15 | 70 | 56 | 189 | 137 | 104 | 72 | 10.12 |
| Example 9† | 1.28 | 45 | 31 | 201 | 122 | 312 | 385 | 10.35 |
| Example 10† | 1.28 | 46 | 33 | 193 | 111 | 327 | 337 | 9.3 |
| Comparative Example 4† | 1.45 | 51 | 34 | 420 | 282 | 505 | 581 | 15.51 |
| Example 5§ | 1.29 | 61 | 57 | 221 | 154 | 55 | 45 | 7.66 |
| Example 6§ | 1.28 | 64 | 52 | 211 | 169 | 55 | 55 | 8.16 |
| Comparative Example 7§ | 1.23 | 64 | 51 | 165 | 100 | 34 | 28 | 7.75 |
| Comparative Example 8§ | 1.54 | 62 | 44 | 420 | 180 | 444 | 368 | 8.2 |

*After 140° F./7 day exposure in Jet Reference Fluid Type I.
**After 140° F./7 day exposure in Jet Reference Fluid Type I. Fuel swell % was measured according to SAE AS5127.
†Thiol-terminated polythioether cured with epoxy.
§Thiol-terminated polysulfide cured with MnO$_2$.

Finally, it should be noted that there are alternative ways of implementing the embodiments disclosed herein. Accordingly, the present embodiments are to be considered as illustrative and not restrictive. Furthermore, the claims are not to be limited to the details given herein, and are entitled their full scope and equivalents thereof.

What is claimed is:

1. A composition, comprising:
   from 45 wt % to 70 wt % of a sulfur-containing prepolymer, wherein the sulfur-containing prepolymer comprises:
   a thiol-terminated polythioether comprising a backbone comprising the structure of Formula (1):

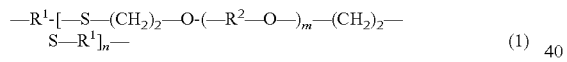
   (1)

wherein,
   each $R^1$ is independently selected from $C_{2-10}$ n-alkanediyl, $C_{3-6}$ branched alkanediyl, $C_{6-8}$ cycloalkanediyl, $C_{6-10}$ alkanecycloalkanediyl, heterocyclic, -[(—CHR$^3$—)$_p$—X—]$_q$—(CHR$^3$)$_r$—, wherein each $R^3$ is selected from hydrogen and methyl;
   each $R^2$ is independently selected from $C_{2-10}$ n-alkanediyl, $C_{3-6}$ branched alkanediyl, $C_{6-8}$ cycloalkanediyl, $C_{6-14}$ alkanecycloalkanediyl, heterocyclic, and -[(—CH$_2$—)$_p$—X—]$_q$—(CH$_2$)$_r$—;
   each X is independently selected from O, S, and —NR—, wherein R is selected from hydrogen and methyl;
   m is an integer from 0 to 50;
   n is an integer ranging from 1 to 60;
   p is an integer ranging from 2 to 6;
   q is an integer ranging from 1 to 5; and
   r is an integer ranging from 2 to 10;
   a thiol-terminated polysulfide having a weight average molecular weight from 1,100 Daltons to 8,000 Daltons; or
   a combination thereof; and
   from 5 wt % to 40 wt % thermoplastic polyphenylene sulfide resin particles,
   wherein wt % is based on the total weight of the composition.

2. The composition of claim 1, wherein the thiol-terminated polythioether prepolymer comprises a thiol-terminated polythioether of Formula (2a), a thiol-terminated polythioether prepolymer of Formula (2b), and a combination thereof:

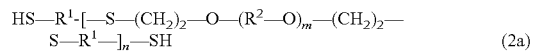
   (2a)

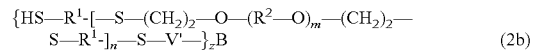
   (2b)

wherein,
   each $R^1$ independently is selected from $C_{2-10}$ alkanediyl, $C_{6-8}$ cycloalkanediyl, $C_{6-14}$ alkanecycloalkanediyl, $C_{5-8}$ heterocycloalkanediyl, and -[(—CHR$^3$—)$_p$—X—]$_q$-(—CHR$^3$—)$_r$—, wherein,
   p is an integer from 2 to 6;
   q is an integer from 1 to 5;
   r is an integer from 2 to 10;
   each $R^3$ is independently selected from hydrogen and methyl; and
   each X is independently selected from —O—, —S—, and —NR—, wherein R is selected from hydrogen and methyl;
   each $R^2$ is independently selected from $C_{2-10}$ alkanediyl, $C_{6-8}$ cycloalkanediyl, $C_{6-14}$ alkanecycloalkanediyl, and -[(—CHR$^3$—)$_p$—X—]$_q$-(—CHR$^3$—)$_r$—, wherein p, q, r, $R^3$, and X are as defined as for $R^1$;
   m is an integer from 0 to 50;
   n is an integer from 1 to 60;
   B represents a core of a z-valent, polyfunctionalizing agent B(—V)$_z$ wherein,
   z is an integer from 3 to 6; and
   each V is a moiety comprising a terminal group reactive with a thiol; and
   each —V'— is derived from the reaction of —V with a thiol, wherein the terminal group reactive with a thiol group comprises an alkanediyl group.

3. The composition of claim 1, wherein the thiol-terminated polythioether prepolymer comprises the reaction product of reactants comprising:
(a) a dithiol of Formula (3):

$$HS-R^1-SH \quad (3)$$

wherein,
R$^1$ is selected from C$_{2-6}$ alkanediyl, C$_{6-8}$ cycloalkanediyl, C$_{6-10}$ alkanecycloalkanediyl, C$_{5-8}$ heterocycloalkanediyl, and -[—(CHR$^3$)$_p$—X—]—(CHR$^3$)$_r$—; wherein,
each R$^3$ is independently selected from hydrogen and methyl;
each X is independently selected from —O—, —S—, —NH—, and —NR— wherein R is selected from hydrogen and methyl;
p is an integer from 2 to 6;
q is an integer from 1 to 5; and
r is an integer from 2 to 10; and
(b) a divinyl ether of Formula (4):

$$CH_2=CH-O-[-R^2-O-]_m CH=CH_2 \quad (4)$$

wherein,
m is an integer from 0 to 50; and
each R$^2$ is independently selected from C$_{1-10}$ alkanediyl, C$_{6-8}$ cycloalkanediyl, C$_{6-14}$ alkanecycloalkanediyl, and -[(—CHR$^3$—)$_p$—X—]$_q$-(—CHR$^3$—)$_r$—, wherein,
each R$^3$ is independently selected from hydrogen and methyl;
each X is independently selected from O, S, NH, and —NR— wherein R is selected from hydrogen and methyl;
p is an integer from 2 to 6;
q is an integer from 1 to 5; and
r is an integer from 2 to 10.

4. The composition of claim 3, wherein the reactants further comprise a polyfunctional compound.

5. The composition of claim 1, further comprising an inorganic filler.

6. The composition of claim 1, wherein the composition further comprises from 1 wt % to 10 wt % of an inorganic filler, wherein wt % is based on the total weight of the composition.

7. The composition of claim 1, wherein the composition further comprises from 20 wt % to 40 wt % of an inorganic filler, where wt % is based on the total weight of the composition.

8. The composition of claim 1, formulated as a sealant.

9. The composition of claim 8, comprising a polyepoxy curing agent.

10. A cured sealant prepared from the composition of claim 8.

11. A method of sealing one or more surfaces, comprising:
applying the composition of claim 8 to one or more surfaces; and
curing the composition to seal the one or more surfaces.

12. A composition, comprising:
(a) from 45 wt % to 70 wt % of a thiol-terminated sulfur-containing prepolymer, wherein the thiol-terminated sulfur-containing prepolymer comprises:
(i) a thiol-terminated polythioether comprising a backbone comprising the structure of Formula (1):

$$-R^1-[-S-(CH_2)_2-O-(-R^2-O-)_m-(CH_2)_2-S-R^1]_n- \quad (1)$$

wherein,
each R$^1$ is independently selected from C$_{2-10}$ n-alkanediyl, C$_{3-6}$ branched alkanediyl, C$_{6-8}$ cycloalkanediyl, C$_{6-10}$ alkanecycloalkanediyl, heterocyclic, -[(—CHR$^3$—)$_p$—X—]$_q$—(CHR$^3$)$_r$—, wherein each R$^3$ is selected from hydrogen and methyl;
each R$^2$ is independently selected from C$_{2-10}$ n-alkanediyl, C$_{3-6}$ branched alkanediyl, C$_{6-8}$ cycloalkanediyl, C$_{6-10}$ alkanecycloalkanediyl, heterocyclic, and -[(—CH$_2$—)$_p$—X—]$_q$—(CH$_2$)$_r$—;
each X is independently selected from O, S, and —NR—, wherein R is selected from hydrogen and methyl;
m is an integer from 0 to 50;
n is an integer ranging from 1 to 60;
p is an integer ranging from 2 to 6;
q is an integer ranging from 1 to 5; and
r is an integer ranging from 2 to 10;
(ii) a thiol-terminated polysulfide having a weight average molecular weight from 1,100 Daltons to 8,000 Daltons; or
(iii) a combination thereof; and
(b) from 5 wt % to 40 wt % of thermoplastic polyphenylene sulfide resin particles;
(c) from 1 wt % to 10 wt % of an inorganic filler; and
(d) a polyepoxy curing agent comprising a novolac epoxy resin, a bisphenol A/epichlorohydrin derived epoxy resin, or a combination thereof
wherein wt % is based on the total weight of the composition.

13. The composition of claim 12, formulated as a sealant.

14. A cured sealant prepared from the composition of claim 12.

15. A method of sealing one or more surfaces, comprising:
applying the composition of claim 12 to one or more surfaces; and
curing the composition to seal the one or more surfaces.

16. The composition of claim 1, wherein the thermoplastic polyphenylene sulfide resin particles are characterized by a density from 1.3 g/cc to 1.4 g/cc.

17. The composition of claim 1, wherein the composition is characterized by a specific gravity from 1.1 to 1.4.

18. The composition of claim 12, wherein the composition is characterized by a specific gravity from 1.1 to 1.4.

* * * * *